US006483835B1

(12) United States Patent
Tanigawa et al.

(10) Patent No.: US 6,483,835 B1
(45) Date of Patent: Nov. 19, 2002

(54) COMMUNICATION SYSTEM WITH COMMUNICATION ROUTE RETRIEVAL AND SELECTION FUNCTION

(75) Inventors: Keiko Tanigawa, Kawasaki (JP); Susumu Matsui, Machida (JP); Koji Tsukada, Tokyo (JP); Tohru Hoshi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/092,941

(22) Filed: Jun. 8, 1998

(30) Foreign Application Priority Data

Jun. 12, 1997 (JP) .............................................. 9-154737

(51) Int. Cl.[7] .............................................. H04L 12/56
(52) U.S. Cl. .................................. 370/395.21; 370/401
(58) Field of Search .................................. 370/230, 231, 370/232, 233, 234, 235, 236, 248, 252, 253, 254, 255, 256, 352, 353, 354, 355, 356, 401, 402, 403, 404, 405, 410, 395.1, 395.2, 395.21, 395.4, 395.41, 395.52

(56) References Cited

U.S. PATENT DOCUMENTS

| 5,687,167 A | * | 11/1997 | Bertin et al. ................. | 370/254 |
| 5,732,078 A | * | 3/1998 | Arango ......................... | 370/355 |
| 5,856,981 A | * | 1/1999 | Voelker ....................... | 371/20.1 |
| 5,933,422 A | * | 8/1999 | Kusano et al. ............... | 370/331 |
| 5,940,372 A | * | 8/1999 | Bertin et al. ................. | 370/238 |
| 5,948,069 A | * | 9/1999 | Kitai et al. .................. | 709/240 |
| 6,078,582 A | * | 6/2000 | Curry et al. ................. | 370/356 |
| 6,154,444 A | * | 11/2000 | Masuo et al. ............... | 370/225 |
| 6,157,648 A | * | 12/2000 | Voit et al. .................... | 370/401 |

OTHER PUBLICATIONS

"Resource ReSerVation Protocol (RSVP) Ver. 1, Functional Specification", RFC 2205, Sep. '97.
"Real Time Voice Over Packet—Switched Networks" ('98/ 2).
"RSVP: A New Resource ReSerVation Protocol", IEEE Network ('93/9).

IEEE Network, Jan./Feb. 1998, "Real–Time Voice Over Packet–Switched Networks", T. Kostas et al., pp., 18–26.

IEEE Network, Sep. 1993, "RSVP: A New Resource Reer-Vation Protocol", L. Zhang et al., pp. 8–18.

Proceedings of the IEEE, vol. 61, No. 3, Mar. 1973, "The Viterbi Algorithm", G. Forney, p. 268–278.

IEEE Transactions on Communications, vol. Com–22, No. 5, May 1974, "Adaptive Maximum–Likelihood Receiver for Carrier–Modulated Data–Transmission Systems", G. Ungerboeck, pp. 624–636.

IEEE Signal Processing Magazine, Sep. 1995, "Implementing the Viterbi Algorithm", H. Lou, pp. 42–52.

IEEE Communications Magazine, May 1991, High–Speed Parallel Viterbi Decoding: Algorithm and VLSI–Architecture, G. Fettweis et al., pp. 46–55.

\* cited by examiner

Primary Examiner—Kwang Bin Yao
(74) Attorney, Agent, or Firm—Mattingly, Stanger & Malur, P.C.

(57) ABSTRACT

A gateway (GW) for relaying a communication between a public telephone network and a routing server for managing use status of the GW and a network are provided on the internet. When a connection request is received, the GW issues a request to retrieve a route in which the costs are minimum and a necessary bandwidth can be reserved. The routing server retrieves the route of the minimum costs using the bandwidth reservation status of the internet and the partner's telephone number and notifies the request issued GW of the address of the partner GW. The costs at that time point may be notified to the user and the user selects whether the communication is performed or not. By managing the current connection information established by each GW, if a necessary bandwidth cannot be reserved, an audio compression ratio may be changed.

14 Claims, 21 Drawing Sheets

ROUTER 104

| NETWORK | ROUTER | INTERFACE | NUMBER OF HOPS |
|---------|--------|-----------|----------------|
| 10.0.0.0 | — | 10.0.0.1 | 1 |
| 20.0.0.0 | — | 20.0.0.1 | 1 |
| 30.0.0.0 | S2 | 20.0.0.1 | 2 |
| 40.0.0.0 | S3 | 20.0.0.1 | 2 |

| 701 | 702 | 703 | 704 | 705 | | | 603 |
|---|---|---|---|---|---|---|---|
| GW-IP ADDRESS | COVER AREA 1 | COST 1 | COVER AREA 2 | COST 2 | ---- | COVER AREA n | COST n |
| 111.222.3.444 | 045(*) | 20 | 044(111)** | 25 | | | |
| ⋮ | ⋮ | ⋮ | ⋮ | ⋮ | | ⋮ | ⋮ |

FIG.8

| 801 | 802 | 803 | 804 | 805 |
|---|---|---|---|---|
| SOURCE GW | DESTINATION GW | WHOLE BANDWIDTH | RESERVATION BANDWIDTH | NUMBER OF CONNECTIONS |
| 133.144.11.222 | 133.100.22.233 | 384kbps | 64kbps | 5 |
| 133.100.22.333 | 222.333.444.555 | 1.5Mbps | 656kbps | 41 |
| ⋮ | ⋮ | ⋮ | ⋮ | ⋮ |

COMMUNICATION SYSTEM WITH COMMUNICATION ROUTE RETRIEVAL AND SELECTION FUNCTION

CROSS-REFERENCE TO RELATED APPLICATION

This application relates to U.S. patent application Ser. No. 08/961,154 filed on Oct. 30, 1997, now U.S. Pat. No. 6,078,583 and assigned to the present assignee. The content of that application is incorporated herein by reference.

BACKGROUND OF THE INVENTION

1. Field of the Invention

The invention relates to a communication system and, more particularly, to a system for transmitting and receiving data in a real-time manner by using the internet.

2. Description of the Related Art

The internet based on TCP/IP is rapidly being spread. The worldwide information communication system such as WWW (World Wide Web) further promotes the spread of the internet. It becomes a common sense that multimedia data including audio and video data is transmitted on the internet. In association with it, a protocol such as RSVP (Resource reSerVation Protocol) or ST-11 to reserve a bandwidth has also been proposed. The RSVP has been disclosed in "RSVP: A New Resource ReSerVation Protocol", (IEEE Network 93/9, p. 8) and "Resource ReSerVation Protocol (RSVP), Ver. 1, Functional Specification", ('97/9). By the bandwidth reservation, a data communication at a rate corresponding to the reserved bandwidth is guaranteed without being influenced by the other traffic.

Under such a background, a communication system called an internet telephone such that a communication terminal is connected to the internet, audio data is transmitted or received in a real-time manner, and a communication similar to a telephone is provided is being spread. A motion to unify a communication onto the internet is becoming active. Particularly, attention is paid to an internet telephone of the type such that the user accesses from a general telephone to an access point in the internet, the internet is used for an interval from the access point to an access point near a partner whom the user wants to call, and the other access point calls a partner telephone using a public telephone network. Thus, for example, now assuming that access points are located in Tokyo and Osaka, if the telephone user calls from Tokyo to Osaka by internet telephone, he pays both of a telephone charge from his telephone to the access point in Tokyo and a telephone charge from the access point in Osaka to a partner's telephone, so that he can call from Tokyo to Osaka cheaper than the case of the telephone communication using the public telephone network. Particularly, such an advantage remarkably appears in case of the international telephone. It is known that the total telephone charge is equal to or less than about 1/100 of the present international telephone charge. The internet telephone has also been disclosed in "Real-Time Voice Over Packet—Switched Networks ('98/2)". It is demanded that the internet telephone conforms with ITU (International Telecommunication Union)—T Recommendation H.323.

In the conventional communication system disclosed in the above literatures, when a plurality of access points have been established, no consideration is taken with respect to whether the selected access points (gateway: GW) provide the minimum costs or an enough bandwidth can be obtained between those access points. In a communication using the selected access points, there is also a problem such that an actual telephone charge which is required for the communication cannot be known when the system is used but can be known only after a debit or the like of such a communication is sent to the user.

SUMMARY OF THE INVENTION

It is an object of the invention to realize a real-time performance of a communication by assuring a necessary bandwidth onto a communication path in case of performing the communication through the internet.

Another object of the invention is to manage costs for communication, select a communication route of the minimum costs, and inform the user of a charge.

A communication system according to the invention comprises: an internet; a telephone network; a plurality of GW(Gateway)s which are connected to the internet and the telephone network; and a routing server which is connected to the internet. Each of the GWs accepts an internet relay request of a communication and a destination telephone number from a telephone.

The routing server has a GW location table for registering a set of each GW and a telephone number of an area where each GW takes charge in a relay and a bandwidth reservation information storage table for managing all of the bandwidths which the GWs have and the reservation bandwidth. The routing server receives the destination telephone number and the reservation bandwidth from the source GW, selects a GW which can cover the telephone number at the minimum costs and can reserve the bandwidth with reference to the table, and notifies the source GW of the selected GW. The source GW establishes a connection to the notified GW while making the bandwidth reservation and executes a data relay. A fact that the bandwidth has been reserved is notified from the destination GW to the routing server. The routing server updates information in the bandwidth reservation information storage table.

BRIEF DESCRIPTION OF THE DRAWINGS

FIG. 7 is a diagram showing a format of a GW location table in the routing server;

FIG. 8 is a diagram showing a format of a bandwidth reservation information storage table in the routing server;

DESCRIPTION OF THE PREFERRED EMBODIMENTS

(1) First Embodiment

Figure 1:
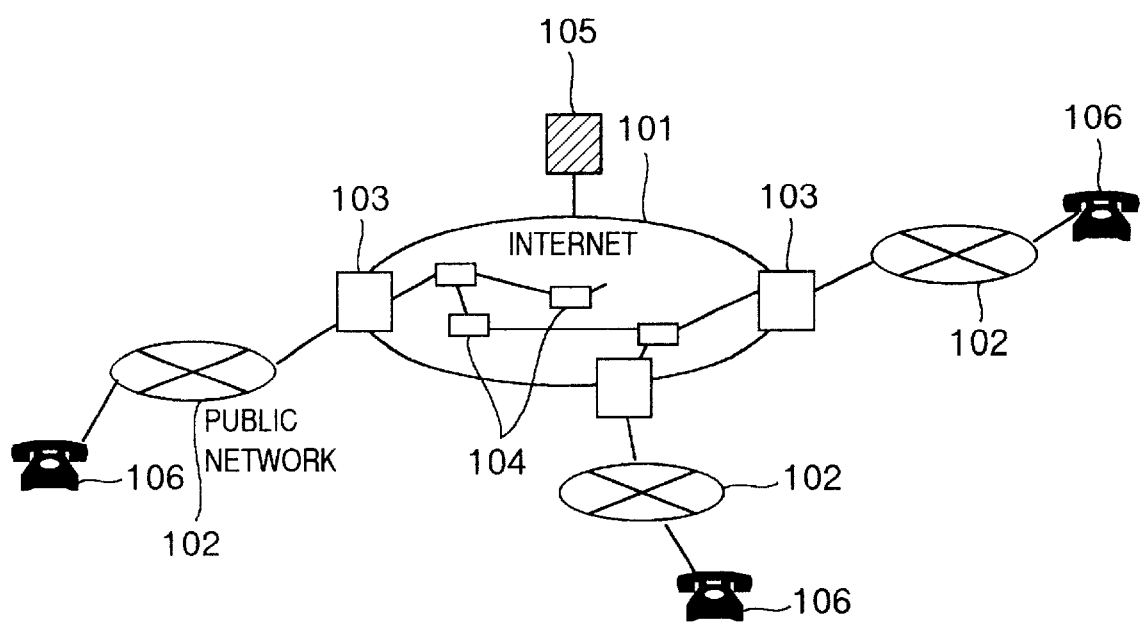
FIG. 1 is a whole constructional diagram of a communication system according to the invention.

FIG. 1 shows a constructional example of a communication system according to the first embodiment of the invention.

In the communication system of FIG. 1, a gateway apparatus (hereinafter, abbreviated as a GW) 103 for relaying is arranged at a connection point of an internet 101 and a public telephone network 102, a router 104 is arranged at a relay point of the internet 101, a telephone 106 is connected to the public telephone network 102, and an apparatus (hereinafter, referred to as a routing server) 105 for retrieving route information is connected to the internet 101.

Figure 2:
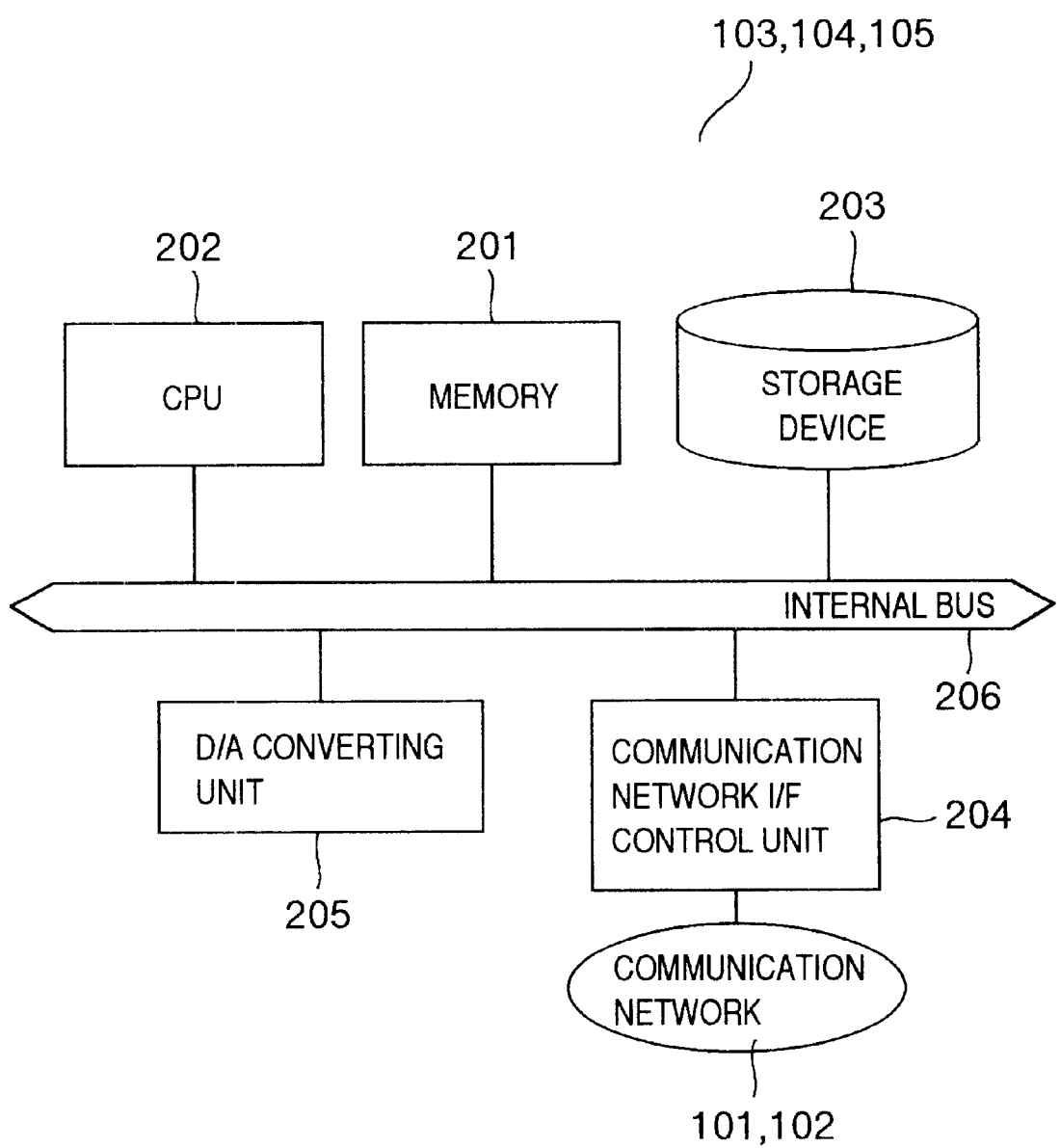
FIG. 2 is a constructional diagram of a GW, a router, and a routing server.

FIG. 2 shows an internal construction of the GW 103, router 104, and routing server 105. Those apparatuses have a similar construction.

In FIG. 2, the GW 103, router 104, and routing server 105 are constructed by: a memory 201 in which communication programs, tables and the like have been stored; a CPU 202 for performing processes based on the programs in the memory 201; a storage device 203; a communication network interface control unit 204 for performing a communication with the internet 101 or public telephone network 102; a digital/analog converting unit 205 for converting analog audio data received from the telephone 106 on the source side into digital data and for converting digital data received from the GW 103 into analog audio data; and an internal bus 206 for connecting each of the above component sections.

Figure 3:
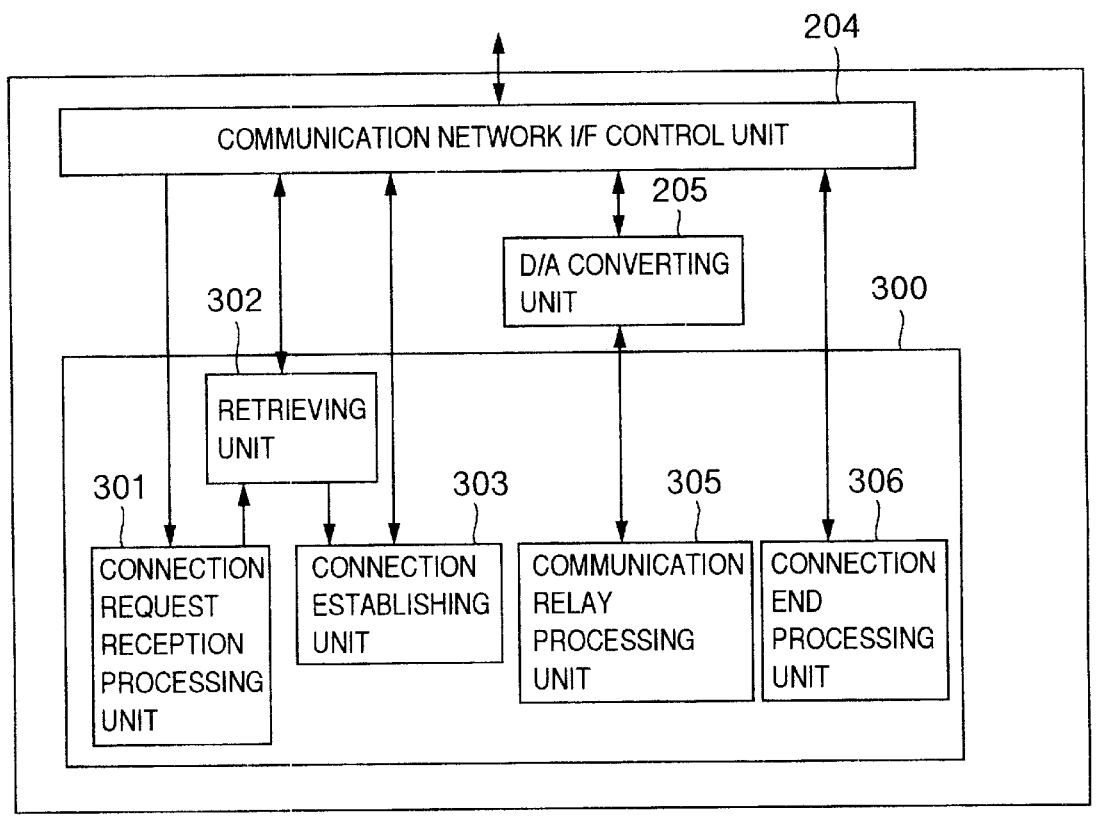
FIG. 3 is a constructional diagram of a communication control unit of the GW in the first embodiment.
Figure 4:
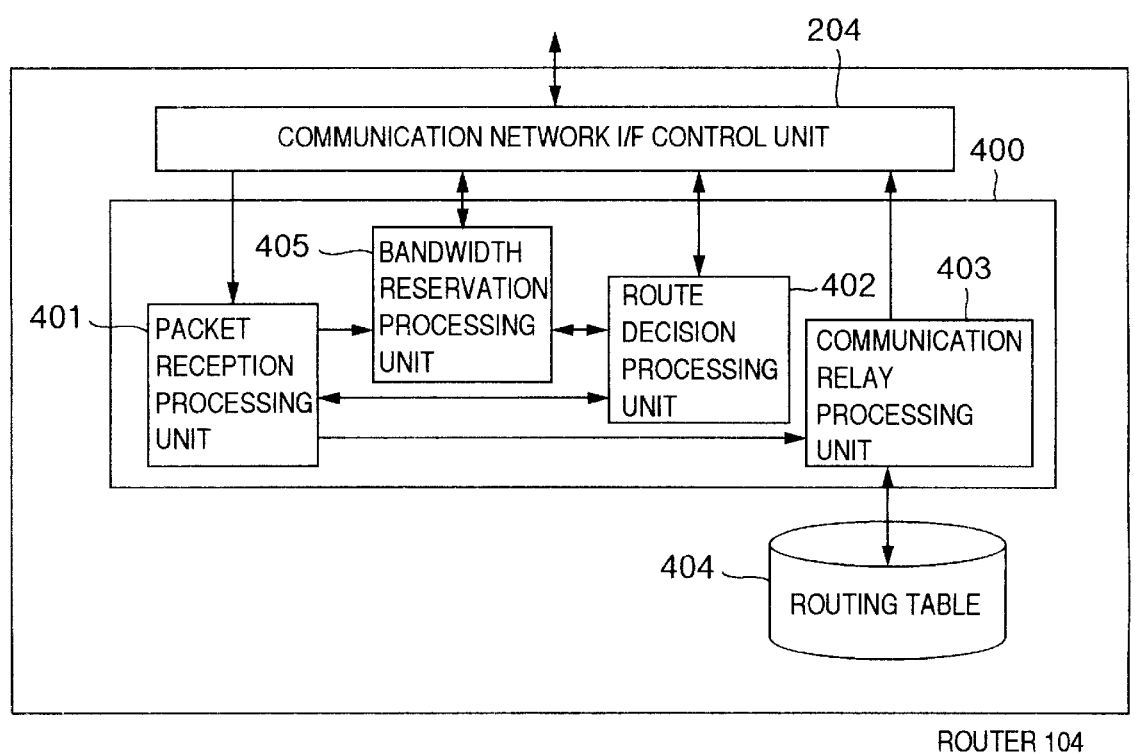
FIG. 4 is a constructional diagram of a communication control unit of the router.
Figure 6:
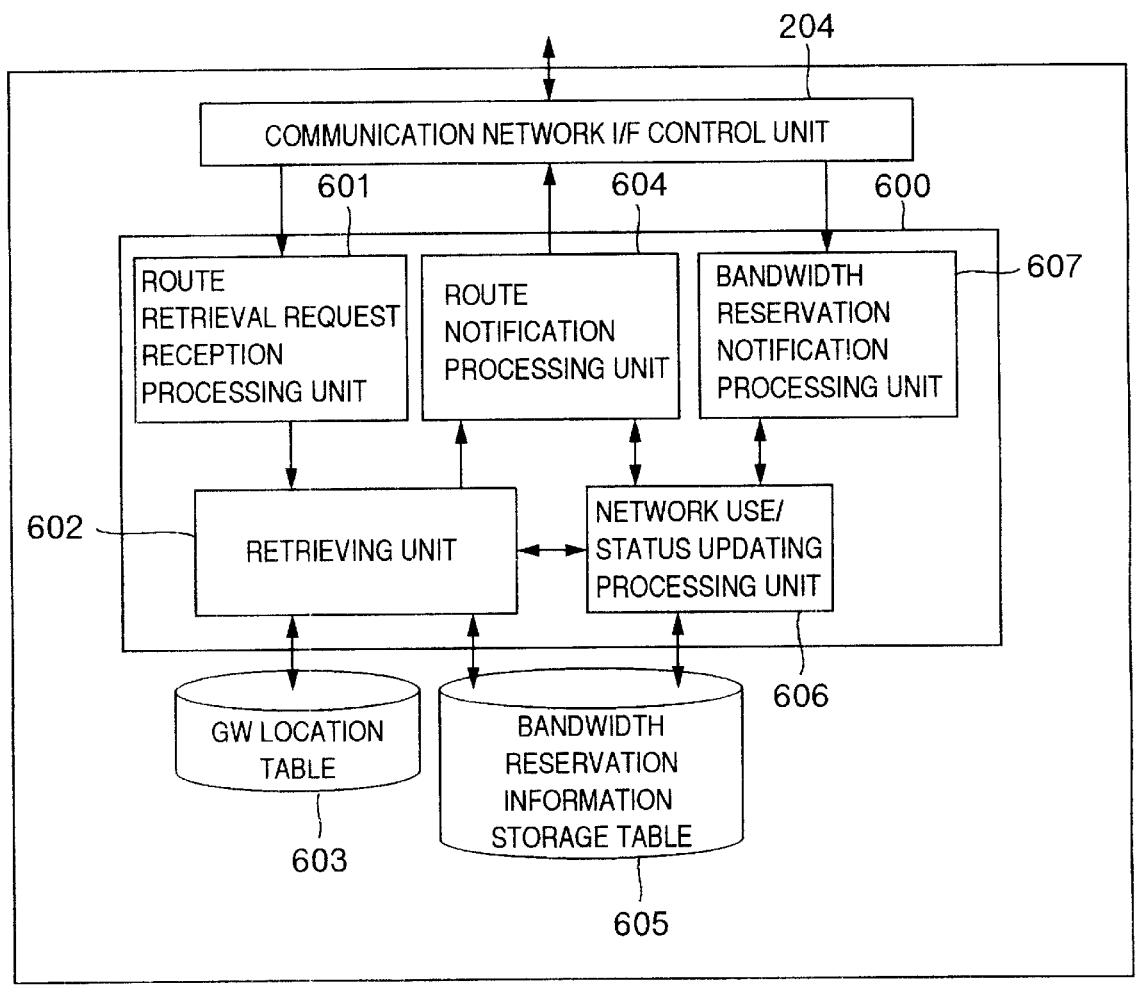
FIG. 6 is a constructional diagram of the routing server.

The CPU 202 executes the communication programs stored in the memory 201 and storage device 203, thereby realizing functions of communication control units 300, 400, and 600 of a GW, a router, and a routing server shown in FIGS. 3, 4, and 6.

FIG. 3 is an explanatory diagram of the communication control unit 300 in case of applying the construction of FIG. 2 to the GW 103. The communication control unit 300 is constructed by a connection request reception processing unit 301, a retrieving unit 302, a connection establishing unit 303, a communication relay processing unit 305, and a connection end processing unit 306.

In the communication control unit 300 in GW 103, when the telephone 106 accesses via the public telephone network 102, the connection request reception processing unit 301 obtains a telephone number of a communication partner and forms a connection request notification. The retrieving unit 302 issues a retrieval request to the routing server 105 with the telephone number of the partner telephone 106 included in the connection request and obtains route information to the communication partner. The connection establishing unit 303 establishes a connection with the GW of the communication relay partner from the route information obtained in the retrieving unit 302. The communication relay processing unit 305 relays the packetized audio data which was converted into the digital data in the digital/analog converting unit 205 to the GW 103 of the communication relay partner. When a communication end notification is received from the telephone 106 or the partner GW 103, the connection end processing unit 306 finishes the communication relay process, disconnects the telephone line, and issues a release notification of the reserved bandwidth to the routing server 105.

Between the own GW and the partner GW, a TCP (Transmission Control Protocol) is used for communication of control data and a UDP (User Datagram Protocol) is used for communication of audio data.

FIG. 4 is an explanatory diagram of the communication control unit 400 in case of applying the construction of FIG. 2 to the router 104. The communication control unit 400 is constructed by a packet reception processing unit 401, a route decision processing unit 402, a communication relay processing unit 403, a routing table 404, and a bandwidth reservation processing unit 405. The routing table 404 exists in the storage device 203 and memory 201.

In FIG. 4, when a packet is received from the GW 103 or other router 104, the packet reception processing unit 401 discriminates whether the received packet is a connection request notification including a bandwidth reservation or audio data with reference to the header information in the received packet. In case of the connection request notification, the packet is transferred to the bandwidth reservation processing unit 405. In case of the audio data, the packet is transferred to the communication relay processing unit 403. The bandwidth reservation processing unit 405 notifies the routing server 105 of the telephone number of the partner telephone 106 included in the connection request notification and obtains an address of the GW for which the requested bandwidth can be reserved and which is the closest to the partner telephone 106. With respect to the route to the destination GW address, a use status of the internet 101 which is connected to the own router is examined, thereby discriminating whether the bandwidth can be reserved or not. The route decision processing unit 402 decides the next router 104 to which the data is transferred or the destination GW 103 from the address of the destination GW 103 received from the routing server 105 with reference to the routing table 404. The communication relay processing unit 403 transfers the data sent from the packet reception processing unit 401 to the route determined by the route decision processing unit 402.

Figures 5A, 5B:
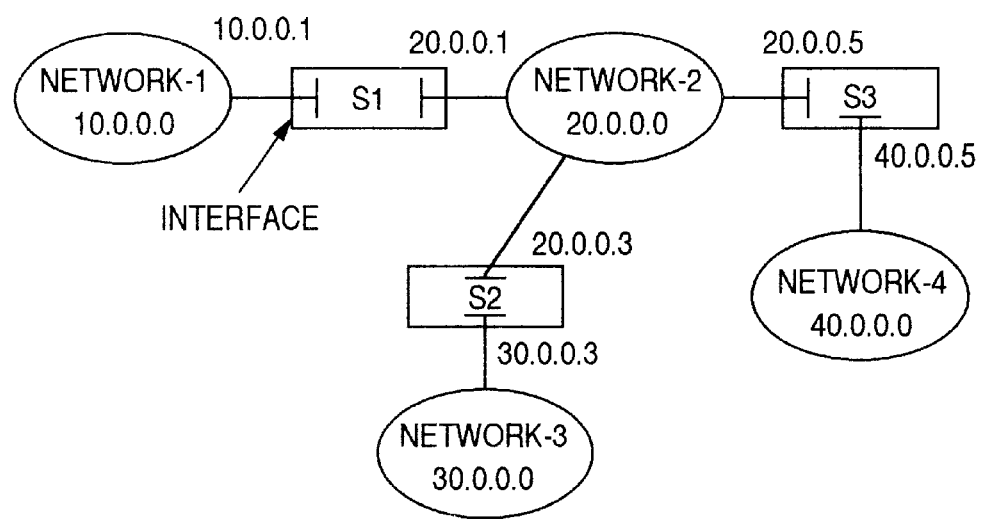
FIG. 5A is a diagram showing a format of a routing table in the router.
FIG. 5B is a network structure example.

FIG. 5A shows an example of a format of the routing table 404 in the router S1 shown in FIG. 5B. Reference numeral 501 denotes an IP address of a network to which the destination GW is connected; 502 a next router to be connected to the destination of the address 501; 503 an IP address which is used when transferring packets to the router 502; and 504 the number of hops (the number of routers) up to the address 501.

The communication control unit 600 of the routing server 105 shown in FIG. 6 is constructed by a route retrieval request reception processing unit 601, a retrieving unit 602, a route notification processing unit 604, a network use status updating processing unit 606, and a bandwidth reservation notification processing unit 607. A GW location table 603 and a bandwidth reservation information storage table 605 are stored in the storage device and the memory.

In the communication control unit 600, when the command received from the GW 103 is a route retrieval request notification, the route retrieval request reception processing unit 601 obtains the telephone number of the destination telephone 106 included in the command and sends it to the retrieving unit 602. The retrieving unit 602 retrieves the nearest GW 103 from the GW location table 603 using the telephone number sent from the route retrieval request reception processing unit 601.

Further, with regard to the GW 103 as a retrieval result, the retrieving unit 602 examines a bandwidth reserving status between the own GW and the relevant GW by using the bandwidth reservation information storage table 605 (which will be explained hereinlater) and sends an examination result to the route notification processing unit 604. In the case where a notification of a new bandwidth reservation, a reservation release, or a bandwidth change is received from the GW, the network use status updating notification processing unit 606 reflects the information about the bandwidth included in such a notification to the bandwidth reservation information storage table 605.

FIG. 7 shows an example of a format of the GW location table 603. Reference numeral 701 denotes an IP address of each GW; 702 an area of a telephone network which is covered by the GWs of the addresses 701; and 703 a telephone charge from the GW in the area 702 to a calling in the area. When the GW supports a plurality of areas, the cover area and cost are registered as a set into subsequent fields 704 and 705. In place of the telephone charge 702 or together with it, a distance between the GW and the area can be also registered.

FIG. 8 shows an example of a format of the bandwidth reservation information storage table 605. Reference numeral 801 denotes an IP address of a source GW 103-1 which accepted a communication request from the telephone 106; 802 an IP address of a destination GW 103-2; 803 a whole bandwidth of the network between the GWs of the addresses 801 and 802; 804 a reserved bandwidth in the network bandwidth 803; and 805 the number of connections established between the GWs.

In the bandwidth reservation information storage table 605, the whole bandwidth 803 and reservation bandwidth 804 are set for a set of source GW of address 801 and a destination GW of address 802. Actually, although there is a case where a plurality of routes exist between the source GW and the destination GW, in this table, the bandwidth of the network which is directly connected to the source GW is managed. For example, when the source GW is connected to the router of the internet through the Ethernet, the bandwidth which can be used by the source GW is set to 10 Mbps. When it is connected via the ISDN, the bandwidth is set to 1.5 Mbps. Such a bandwidth may be used for the one destination GW. Or a bandwidth of only a predetermined ratio may be allocated to one destination GW (it is set as a whole bandwidth 803 in the table). The actual bandwidth reservation is performed by using RSVP.

Figure 9:
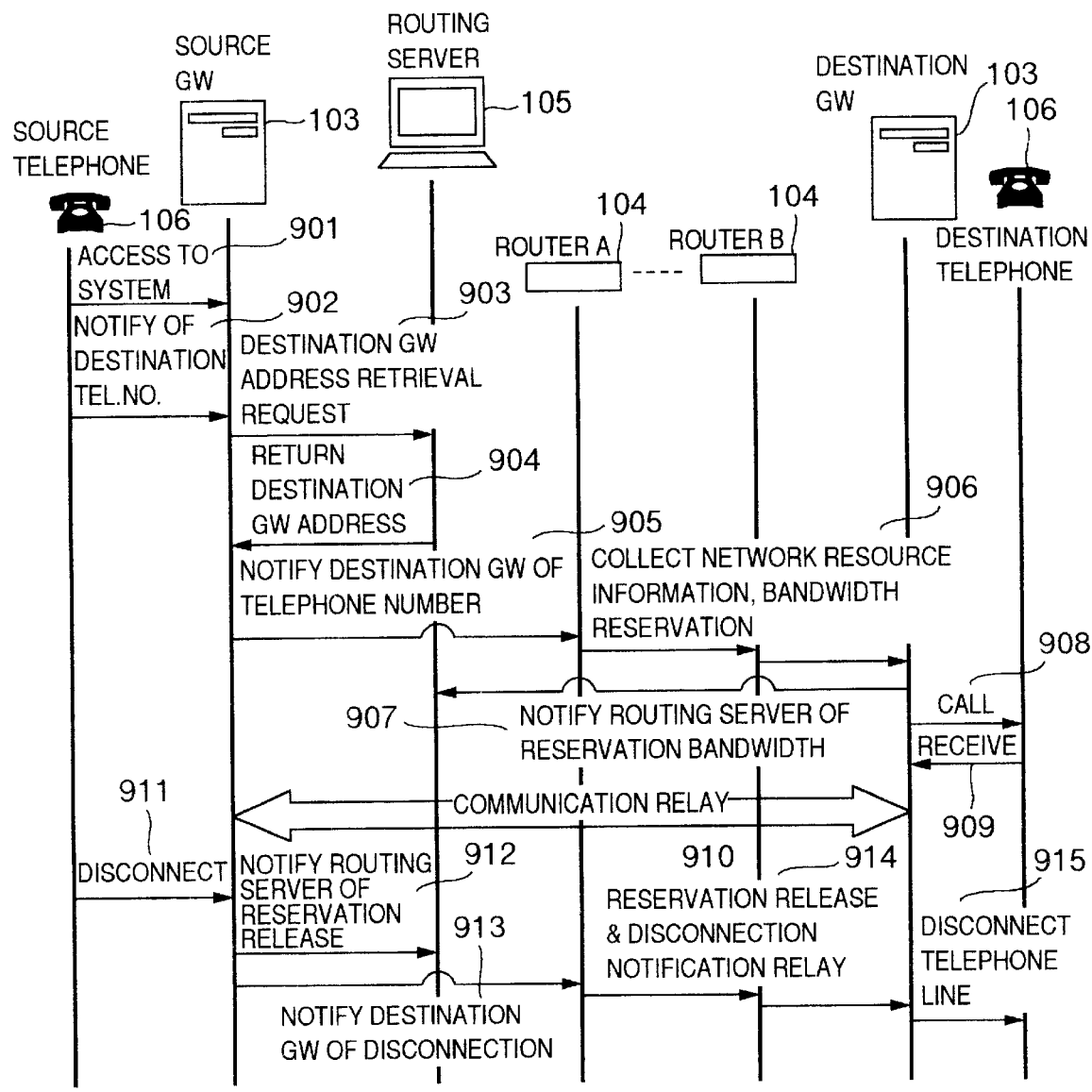
FIG. 9 is a sequence diagram of a system in the first embodiment.

FIG. 9 shows an example of a sequence of the system of the embodiment.

In FIG. 9, an access is requested from the source telephone 106 to the system (step 901). The telephone number of the partner to be communicated is notified (step 902). The source GW 103 which accepted the access request requests the routing server 105 to retrieve the IP address of the destination GW using the partner's telephone number notified in step 902 (step 903). The routing server 105 retrieves the destination GW from the GW location table 603 and bandwidth reservation information storage table 605 and returns the relevant IP address (step 904). The source GW 103 notifies the destination Gw of a connection establishment request including the partner's telephone number and the reservation bandwidth by using the received IP address (step 905). Each router 104 relays the connection establishment request and reserves the bandwidth on the basis of the IP address of the destination GW (step 906). When the connection establishment request is received, the destination GW notifies the routing server 105 of the bandwidth reservation (step 907) and calls to the destination telephone (step 908). When the destination user off-hooks (step 909), the communication is relayed by using the route in which the bandwidth has been reserved (step 910). When the user on-hooks (step 911), the source GW 103 issues a bandwidth reservation release notification to the routing server 105 (step 912) and issues a disconnection notification to the destination GW 103 (step 913). Each router 104 relays a disconnection notification (step 914). When the disconnection notification is received, the destination GW disconnects the telephone line to the telephone 106 (step 915).

According to the foregoing procedure, the connection is established while performing the bandwidth reservation from the source GW to the destination GW via the router and, at a time point when the bandwidth reservation is completed in all of the apparatuses, a reservation registration into the bandwidth reservation information storage table 605 in the routing server 105 is performed by the notification from the destination GW. In the bandwidth reservation procedure, the bandwidth reservation is requested by the source GW. The reservation determination may be made from the destination GW in reverse way of the bandwidth reservation request in the respective devices. On the other hand, the bandwidth reservation is released by the notification from the GW on the side which issued the disconnection (connection end) notification.

Figure 10:
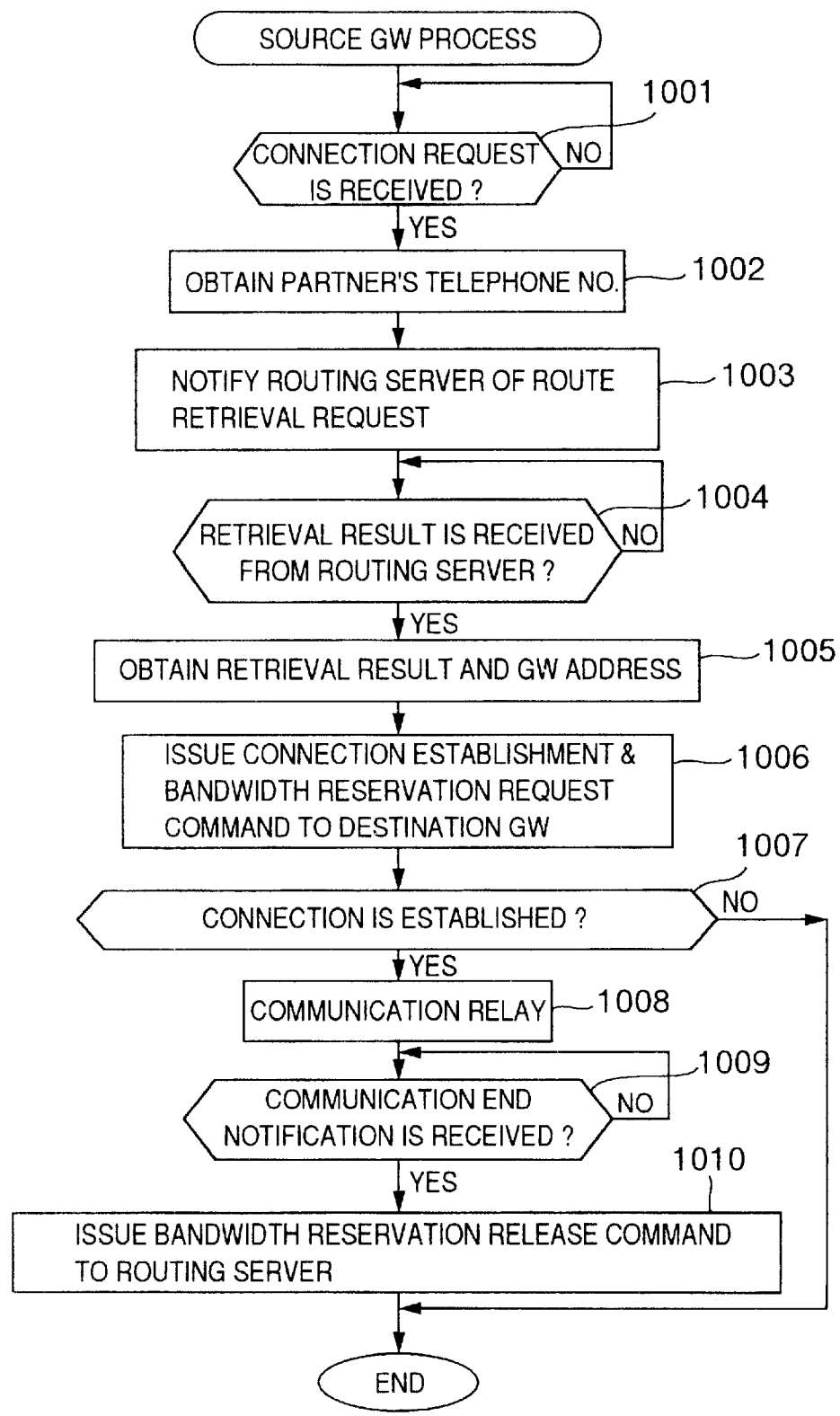
FIG. 10 is a flowchart for processes of a source GW in the first embodiment.
Figure 11:
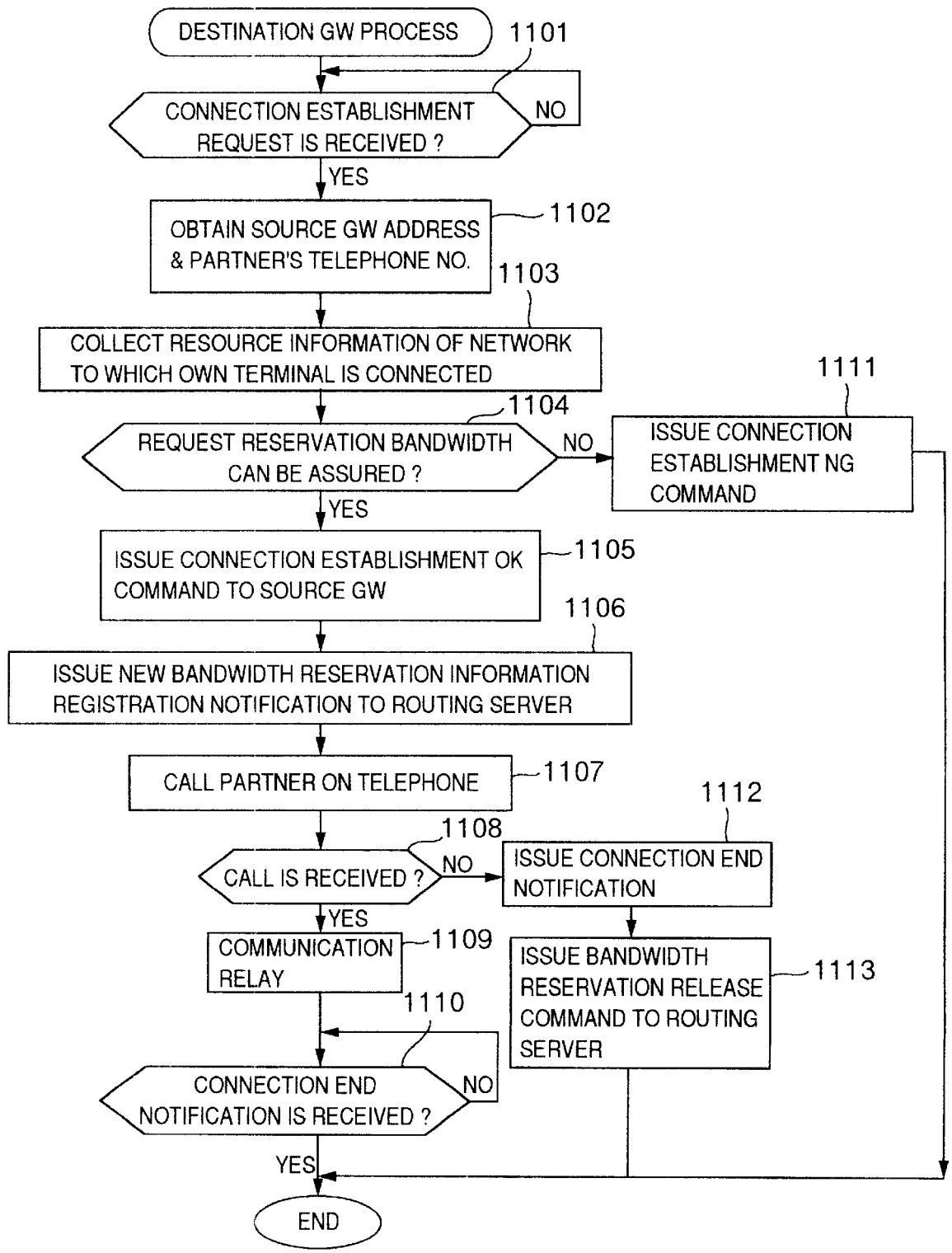
FIG. 11 is a flowchart for processes of a destination GW in the first embodiment.

FIGS. 10 and 11 show processes of the GW 103. FIG. 10 shows a flow of the processes of the source GW. FIG. 11 shows a flow of the processes of the destination GW. For convenience of explanation, the source GW is labeled as 103-1 and the destination GW is shown by 103-2.

In FIG. 10, when the connection request is received from the telephone 106 (step 1001), the source GW 103-1 obtains the partner's telephone number included in the request (step 1002). A request notification to retrieve the GW 103-2 in which the bandwidth can be reserved and the minimum costs are provided or which is the closest to the partner's telephone is issued to the rouging server 105 from the partner's telephone number obtained in step 1002 (step 1003). The amount of the bandwidth to be reserved is determined by the GW in accordance with the kind of data to be relayed. For example, in the case where the GW connected to a serial circuit network relays audio data coded in G. 723.1 (5.3 kbps), a bandwidth to be reserved is 14 kbps which is for the audio data and the header information. When a retrieval result is received by the routing server 105 (YES in step 1004), the address of the communication partner's GW 103-2 included in the retrieval result is obtained (step 1005).

A connection establishment request command including a bandwidth reservation request is issued to the GW 103-2 which is included in the retrieval result (step 1006). When a connection establishment OK notification is sent from the partner GW 103-2 (YES in step 1007), a relaying process of the communication between the telephones 106 is performed between the relevant GWs 103 (step 1008). When a communication end notification from the telephone 106 is received (YES in step 1009), the communication relaying process is finished and the telephone line is disconnected. A bandwidth reservation release command is issued to the routing server 105 (step 1010).

FIG. 11 shows a flow of the processes of the destination GW 103-2 according to the embodiment.

In FIG. 11, when a connection establishment request notification from the source GW 103-1 is received (YES in step 1101), the destination GW 103-2 obtains the address of the source GW 103-1 included in the notification and the telephone number of the destination telephone 106 (step 1102) and collects the resource information of the network to which the own GW is connected (step 1103). The network resource information includes a use status of the telephone line, bandwidth, port, and the like. As a method of collecting the network resource information, the method known in the foregoing RSVP can be used. When the reservation bandwidth included in the connection establishment request can be assured (YES in step 1104), a connection establishment OK command is issued to the source GW 103-1 (step 1105). A new bandwidth reservation registration notification is issued to the routing server 105 (step 1106). When the reservation bandwidth cannot be assured (NO in step 1104), a connection establishment NG command is issued to the source GW 103-1 (step 1111) and the processes are finished. In the case where the partner user does not answer the phone (NO in step 1108) in spite of a fact that the connection is established with the source GW 103-1 and the destination GW 103-2 calls to the destination telephone 106 (step 1107), a connection end notification is issued to the source GW 103-1 (step 1112). A bandwidth reservation release command is issued to the routing server 105 (step 1113) and the processes are finished. When the partner user off-hooks (YES in step 1108), a relaying process of the communication with the telephone 106 is performed (step 1109). When the connection end notification from the partner GW 103-1 is received (YES step 1110), the communication relaying process is finished and the telephone line is disconnected.

Figure 12:
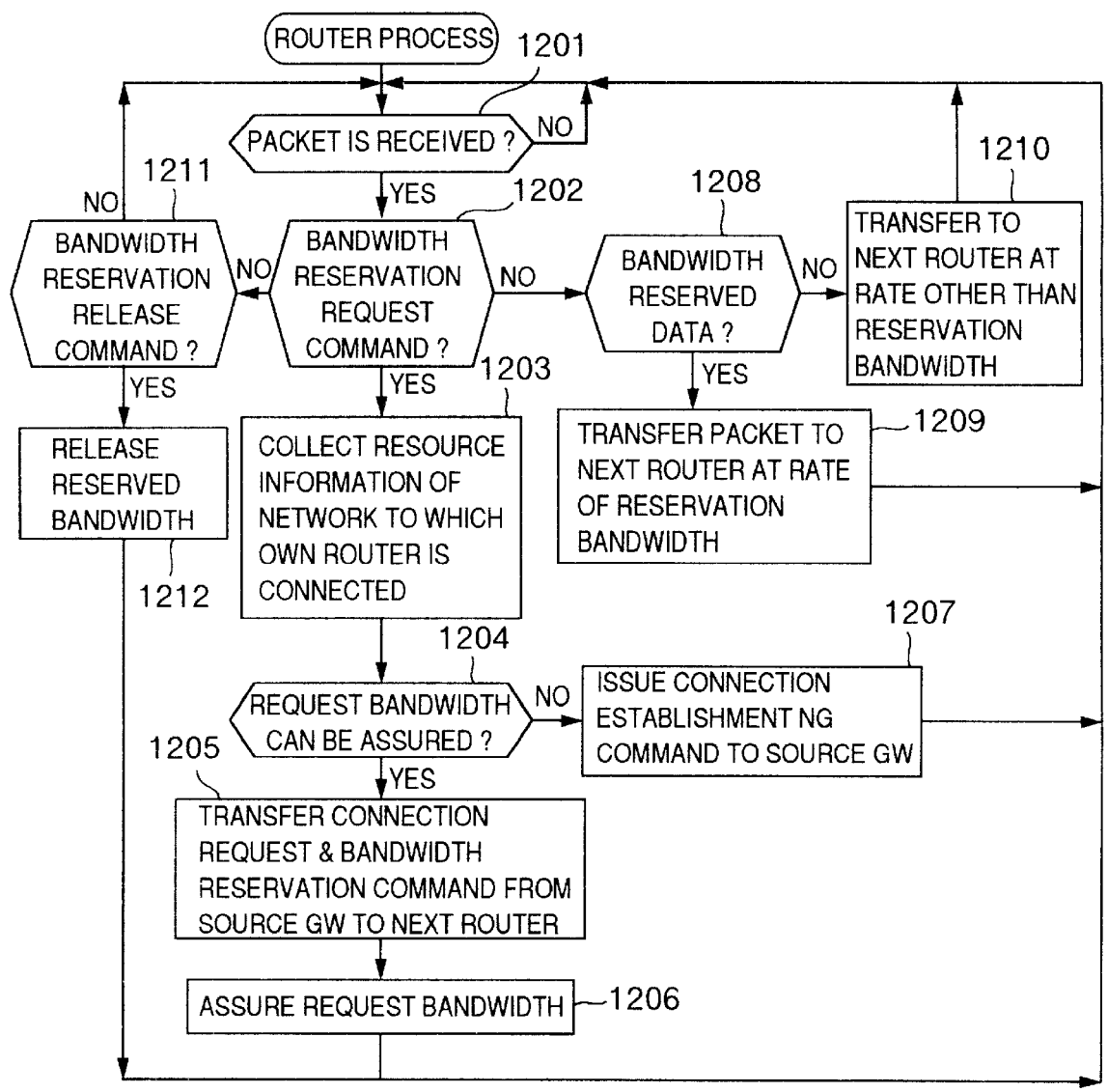
FIG. 12 is a flowchart for processes of the router in the first embodiment.

FIG. 12 shows a flow of the processes of the router 104 in the embodiment.

In FIG. 12, when the router 104 receives the packet (YES in step 1201), if the packet is the connection establishment request command including the bandwidth reservation request (YES in step 1202), the router 104 collects the resource information of the network to which the own router is connected by using the RSVP in a manner similar to the explanation of FIG. 11 (step 1203). When the required bandwidth can be assured (YES in step 1204), the connection request command from the source GW 103-1 is transferred to the next router 104 or the GW 103 as a next transfer destination (step 1205) and the request bandwidth is assured (step 1206). When the required bandwidth cannot be assured (NO in step 1204), a connection establishment NG command is issued to the source GW 103-1 (step 1207). When the received packet is the audio data of the connection in which the bandwidth reservation has already been finished (YES in step 1208), the packet is transferred to the next transfer destination router 104 or the GW 103 at the rate of the reservation bandwidth (step 1209). When the packet for which the bandwidth is not reserved is received (NO in step 1208), the data is transferred to the next transfer destination by using the remaining bandwidth which is the difference between the whole communication bandwidth and the reserved bandwidth (step 1210). When the received packet is a communication end or a bandwidth reservation release command due to a reason such that the reservation of the transfer destination is impossible or the like (YES in step 1211), the reserved bandwidth is released (step 1212).

Figure 13:
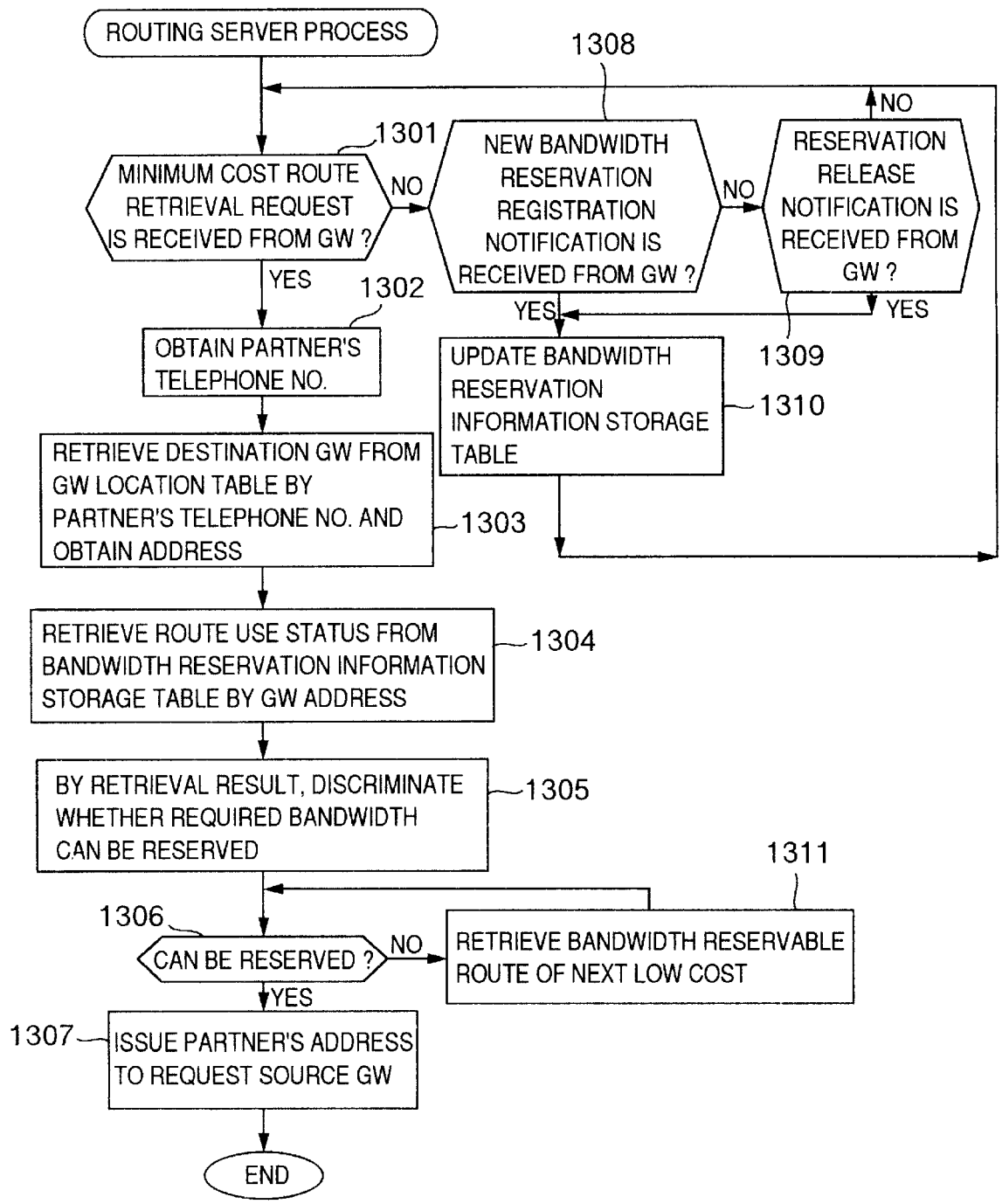
FIG. 13 is a flowchart for processes of the routing server in the first embodiment.

FIG. 13 shows an example of a flow of the processes of the routing server 105 in the embodiment.

In FIG. 13, when a minimum cost route retrieval request notification is received from the source GW 103-1 (YES in step 1301), the routing server 105 obtains the partner's telephone number from the notification (step 1302), retrieves the GW 103-2 which can access to the partner's telephone 106 at the minimum costs using the telephone number from the GW location table 603 and obtains the address of the relevant GW (step 1303). From the relevant GW address, a network use status between the GW 103-1 and the GW 103-2 is examined by using the bandwidth reservation information storage table 605 (step 1304). A check is made to see if the requested bandwidth can be reserved (step 1305). If it is possible (YES in step 1306), the address of the GW 103-2 as a communication relay partner is notified to the source GW 103-1 (step 1307). When the requested bandwidth cannot be reserved (NO in step 1306), the GW which can connect at the next low costs is subsequently retrieved from the GW location table 603 and bandwidth reservation information storage table 605 (step 1311). When the new bandwidth reservation registration notification is received from the GW 103 (YES in step 1308), the route information between the notified GWs is updated for the bandwidth reservation information storage table 605 (step 1310). When a reservation release notification is received from the GW 103 (YES in step 1309), the information between the notified GWs in the bandwidth reservation information storage table 605 is updated (step 1310).

In the route retrieval which is executed in steps 1306 and 1311, it is also possible to construct in a manner such that limit values of the time, the number of times, costs, and the like for retrieval are preliminarily determined by a contract with the user and if exceeding those limit values, a state that the communication is impossible is notified to the user.

(2) Second Embodiment

The second embodiment of the invention will now be described with reference to FIGS. 14 and 15.

According to a communication system of the embodiment, a process to make a voice response to the user who uses a telephone is added to the processes (FIG. 3) of the GW 103 of the first embodiment. A whole construction of the system and the processes of the destination GW, router, and routing server, and the like are substantially the same as those in the first embodiment (FIGS. 4 to 8, FIGS. 11 to 13).

Figure 14:
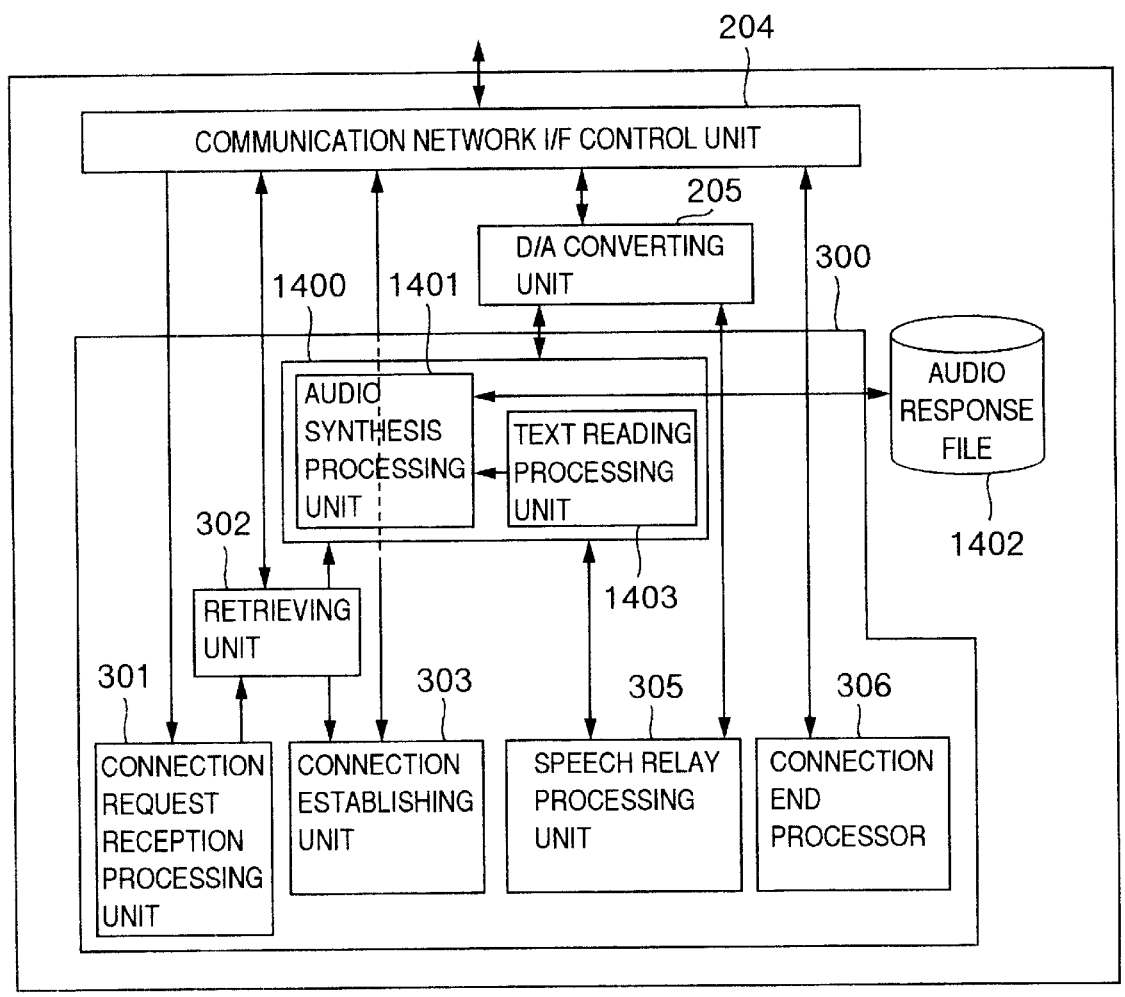
FIG. 14 is a constructional diagram of a communication control unit of a GW according to the second embodiment.

FIG. 14 is a diagram showing a construction of the GW 103 of the embodiment.

In FIG. 14, an audio response processing unit 1400 executes a process to notify the user of the costs obtained as a minimum cost route retrieval result from the routing server 105. An audio synthesis processing unit 1401 audio synthesizes the cost information obtained from the retrieving unit 302 with audio data from a text reading processing unit 1403 using an audio response file 1402 which is stored into the storage device 203 and transmits the synthesized data to the telephone line through the digital/analog converting unit 205.

Figure 15:
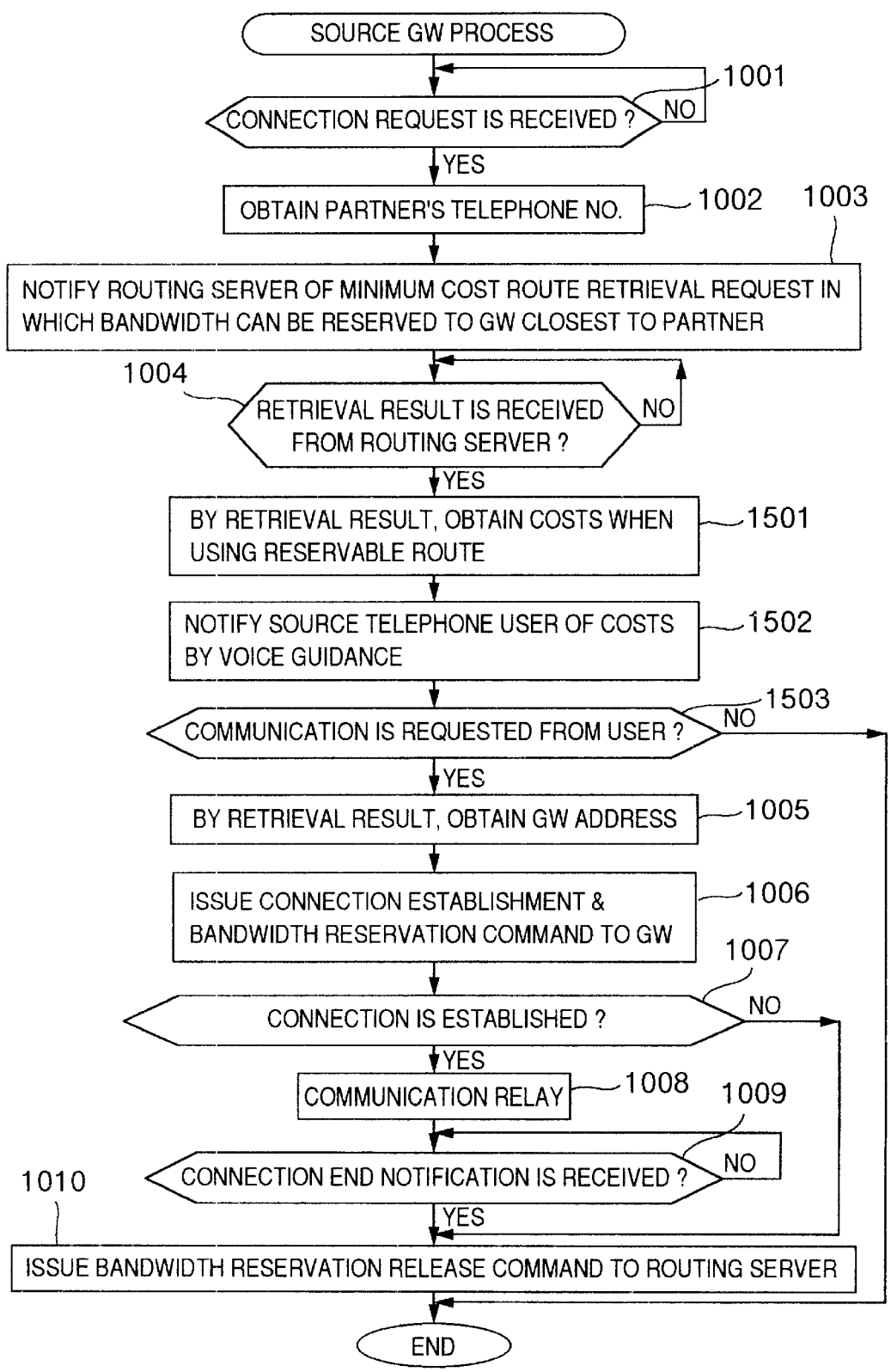
FIG. 15 is a flowchart for processes of a source GW in the second embodiment.

FIG. 15 shows a flow of the processes of the source GW 103 in the embodiment. Only the portions different from the processes of the source GW in the first embodiment (FIG. 10) will be described.

In FIG. 15, when the retrieval result is received from the routing server 105 in step 1004, the GW 103 obtains the cost information in case of relaying a communication by using the route in which the bandwidth can be reserved (step 1501). In the audio response processing unit 1400, the obtained cost information is notified to the source telephone user by a voice guidance (step 1502). When a tone signal or the like indicating the communication request is received from the source telephone user (YES in step 1503), the processes after step 1005 are executed and the communication relay is executed. When the communication request is not received from the user (NO in step 1503), the communication relaying process is finished.

(3) Third embodiment

The third embodiment of the invention will now be described with reference to FIGS. 16 to 18.

In a communication system of the embodiment, when there is no route which can assure a bandwidth enough to communicate, the user is allowed to select either a mode in which the communication is executed by using the public telephone network or a mode in which a bandwidth as much as possible is assured and even if a communication quality slightly deteriorates, the communication is performed via the internet.

A whole construction of the system, the processes of the GW 103, router 104, and routing server 105, and the like are substantially the same as those in the first embodiment.

Figure 16:
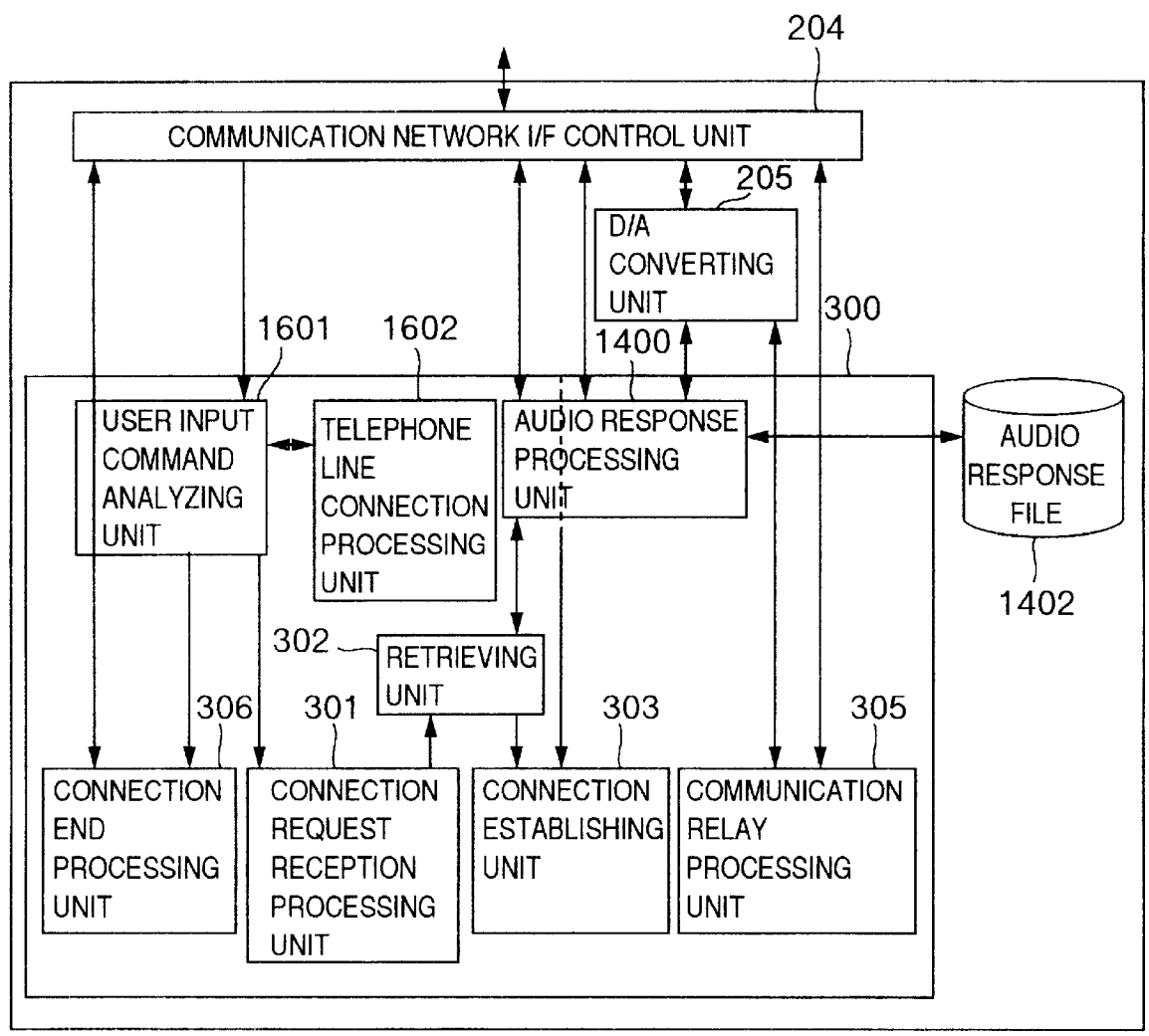
FIG. 16 is a constructional diagram of a communication control unit of a GW according to the third embodiment.

FIG. 16 shows a construction of the communication control unit 300 of the GW 103.

As shown in FIG. 16, the following units are added to the GW 103 of the first embodiment. Namely, a user input command analyzing unit 1601 for accepting some signal (for example, tone signal) from the telephone user and analyzing and a telephone line connection processing unit 1602 for executing processes in the case where the user requests to use the public telephone network as a result of an analysis in the analyzing unit 1601 are added. The unit 1602 calls to the partner's telephone 106 via the telephone line and connects to the telephone line of the user on the source side.

Figure 17:
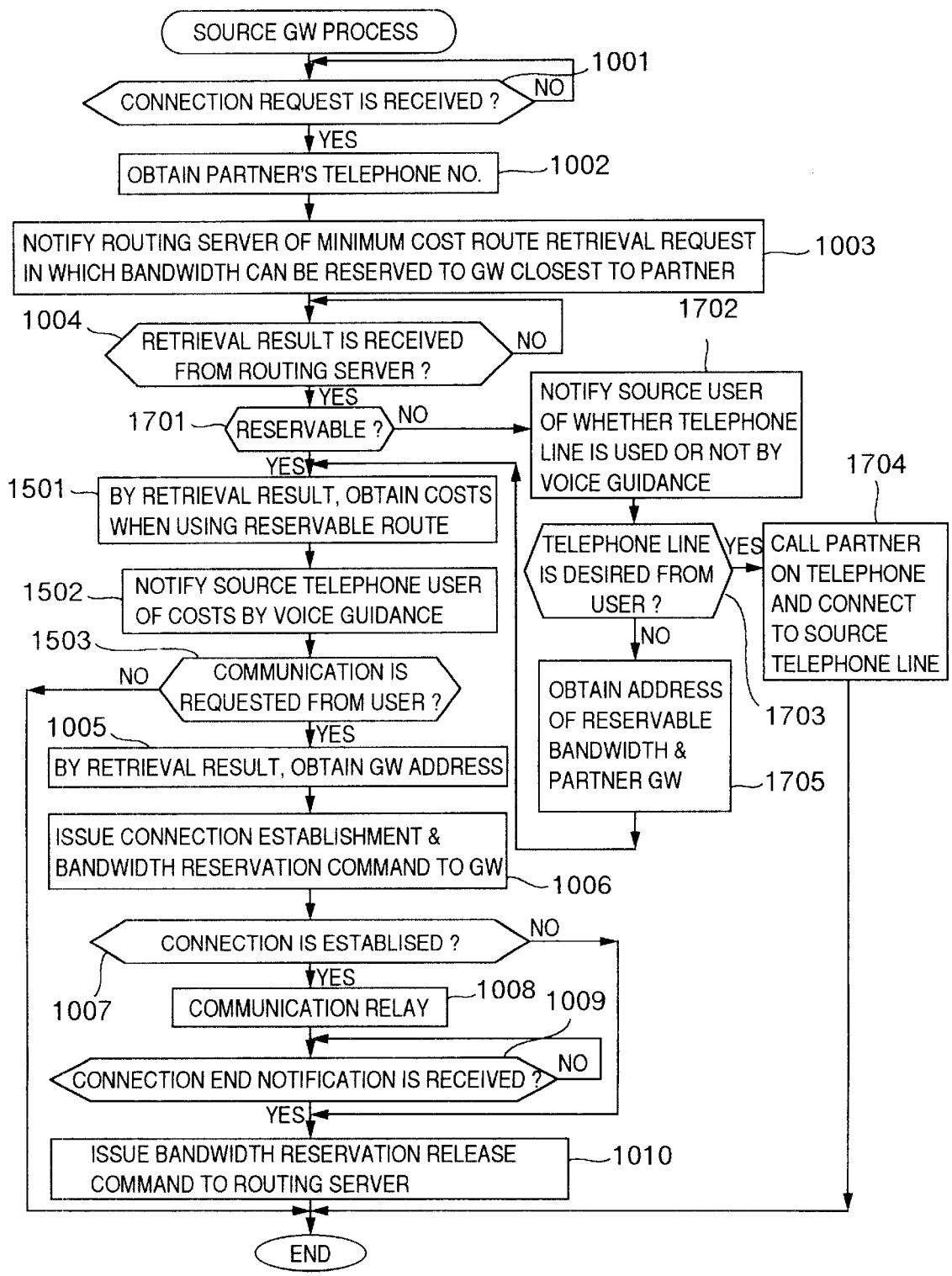
FIG. 17 is a flowchart for processes of a source GW in the third embodiment.

FIG. 17 shows a flow of the processes of the source GW 103 of the embodiment. Only the portions different from the processes of the source GW 103 in the second embodiment (FIG. 15) will now be described.

In FIG. 17, when the bandwidth reservation is impossible as a retrieval result notified from the routing server 105 in step 1004 (NO in step 1701), the GW 103 inquires whether the telephone line is used or not to the source telephone user by reading the data in the audio response file 1402 by the audio response processing unit 1400 (step 1702). When some signal indicating the use of the telephone line is received from the user (YES in step 1703), the GW calls to the partner's telephone 106 and connects to the telephone line which is used by the source user (step 1704). When the user requests to use the internet instead of the telephone line (NO in step 1703), the GW requests to reserve a bandwidth as much as possible and inquires the address of the GW 103 of the communication relay destination to the routing server 105 (step 1705). And the subsequent communication relaying process is executed.

Figure 18:
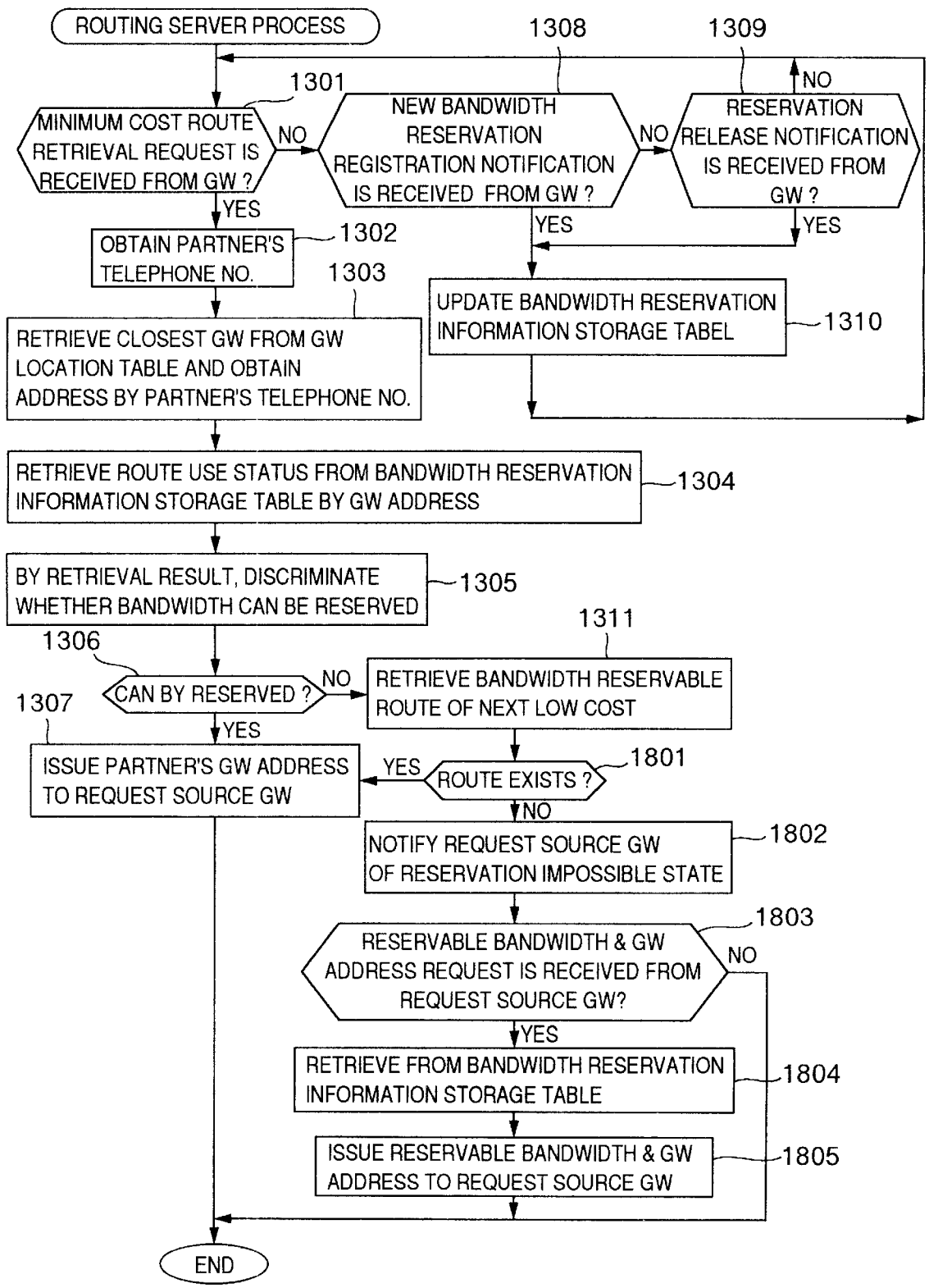
FIG. 18 is a flowchart for processes of a routing server in the third embodiment.

FIG. 18 shows an example of a whole flow of the processes of the routing server 105 in the embodiment. Only the portions different from the processes of the routing server in the first embodiment (FIG. 13) will now be described.

In FIG. 18, when there is no route which can reserve a bandwidth sufficient to communicate in step 1305 mentioned above (NO in step 1801), the routing server 105 issues a reservation impossible notification to the source GW 103-1 (step 1802). When a request to reserve the bandwidth as much as possible and the address request of the communication relay destination GW are sent from the source GW 103-1 (YES in step 1803), a destination GW and a reservable bandwidth are retrieved from the bandwidth reservation information storage table 605 (step 1804). A retrieval result is notified to the source GW 130-1 (step 1805).

(4) Fourth Embodiment

The fourth embodiment of the invention will now be described with reference to FIGS. 19 to 22.

In a communication system of the embodiment, when a plurality of connections exist between certain GWs 103, if a communication request is newly generated between those GWs 103, by raising a compression ratio of audio data, the communication can be relayed without newly reserving a bandwidth, thereby enabling more users to use the system.

Figure 19:
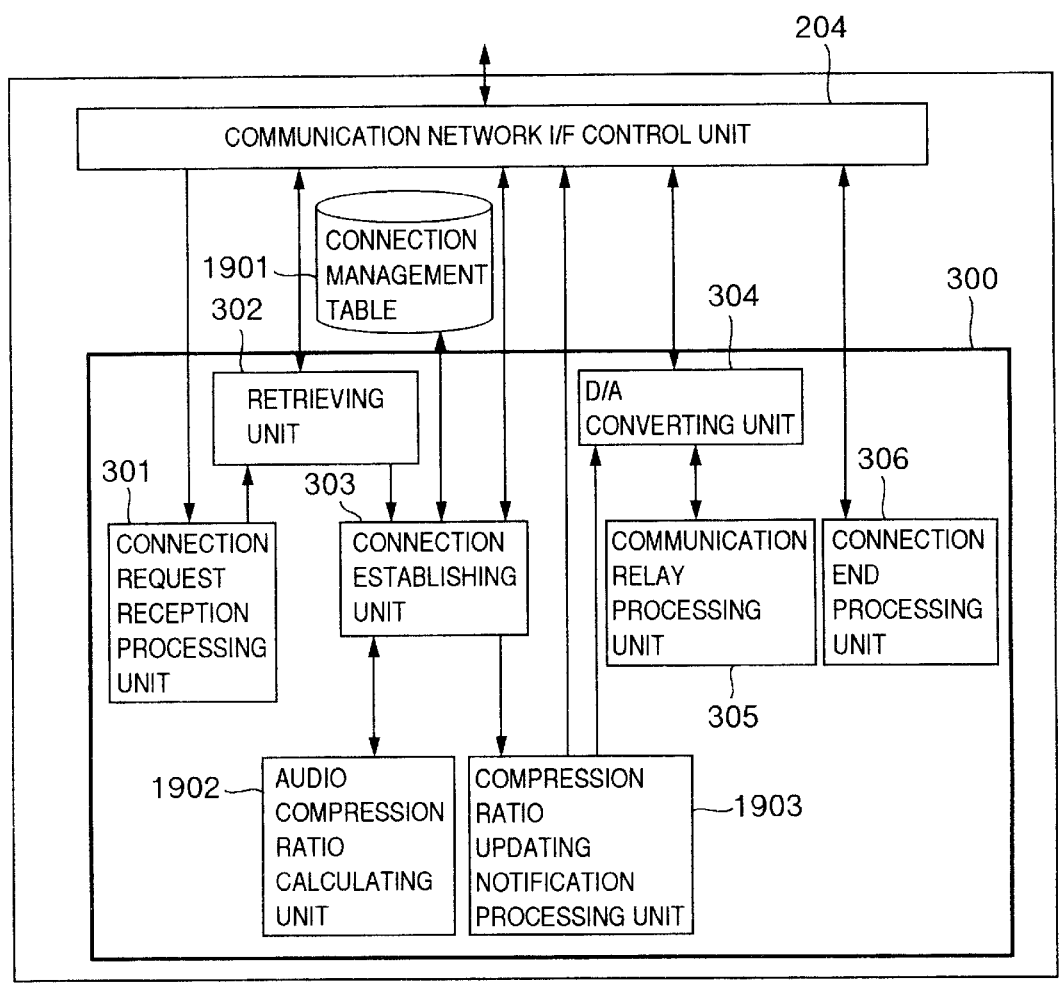
FIG. 19 is a constructional diagram of a communication control unit of a GW according to the fourth embodiment.

A whole construction of the system and a construction, processes, and the like of the GW 103, router 104, and routing server 105 are substantially the same as those of the foregoing first embodiment. However, as shown in FIG. 19, some elements are added to the GW 103, which elements are a connection management table 1901 for managing connections relayed by the own GW, an audio compression ratio calculating unit 1902 for calculating an audio compression ratio from the number of relay connections, and a compression ratio updating notification processing unit 1903 for notifying the routing server 105 and the relay destination GW 103 of the updating of the compression ratio in case of changing the compression ratio.

Figure 20:
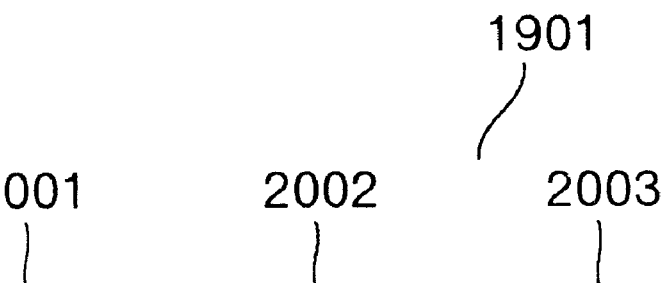
FIG. 20 is a diagram showing a format of a connection management table in the GW in the fourth embodiment.

FIG. 20 shows a format of the connection management table 1901. A destination GW 2001 shows an IP address of the destination GW. A reservation bandwidth 2002 shows a bandwidth which has been reserved with respect to the connection established between the own GW and the destination GW 2001 by the own GW. A connection number 2003 denotes the number of connections established between the own GW and the destination GW 2001.

Figure 21:
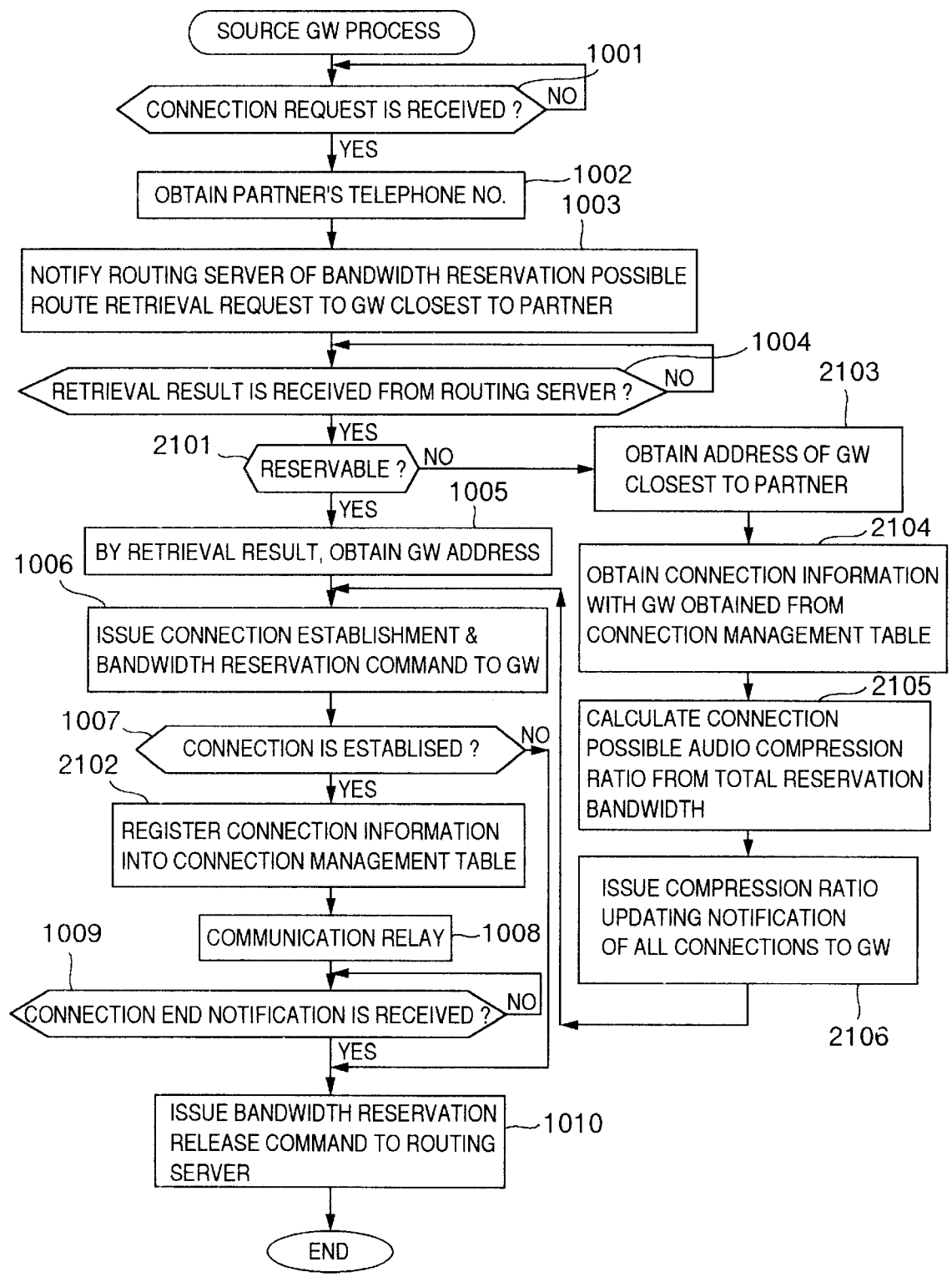
FIG. 21 is a flowchart for processes of a source GW in the fourth embodiment.

FIG. 21 shows an example of a whole flow of the processes of the source GW 103 in the embodiment. Only the portions different from the processes of the source GW in the first embodiment (FIG. 10) will now be explained.

In FIG. 21, when the communication relay destination GW 103 receives a route retrieval result from the routing server 105 in step 1004, if the retrieval result indicates that the bandwidth can be reserved (YES in step 2101) and if a connection establishment OK command is received from the destination GW 103 in step 1007, the connection information is registered into the connection management table 1901 (step 2102). When the bandwidth cannot be reserved as a retrieval result (NO in step 2101), the address of the GW 103 of the low communication costs or of the closest to the partner's telephone 106 is obtained from the routing server 105 (step 2103). The connection information to the relevant GW 103 is derived from the connection management table 1901 (step 2104). In case of newly establishing one connection, a bandwidth to be allocated to one connection is calculated and an audio compression ratio is obtained from the present total reservation bandwidths obtained from the connection information (step 2105). Specifically speaking, the reservation bandwidth 2002 is divided by (the number of connections 2003 which have already been connected +1) and a resultant bandwidth is used as an allocation bandwidth for a connection. A notification to update the compression ratio of all of the connections between the own GW and the destination GW is issued to the destination GW 103 (step 2106). In response to a new connection request, a series of relaying processes after step 1006 is executed.

Figure 22:
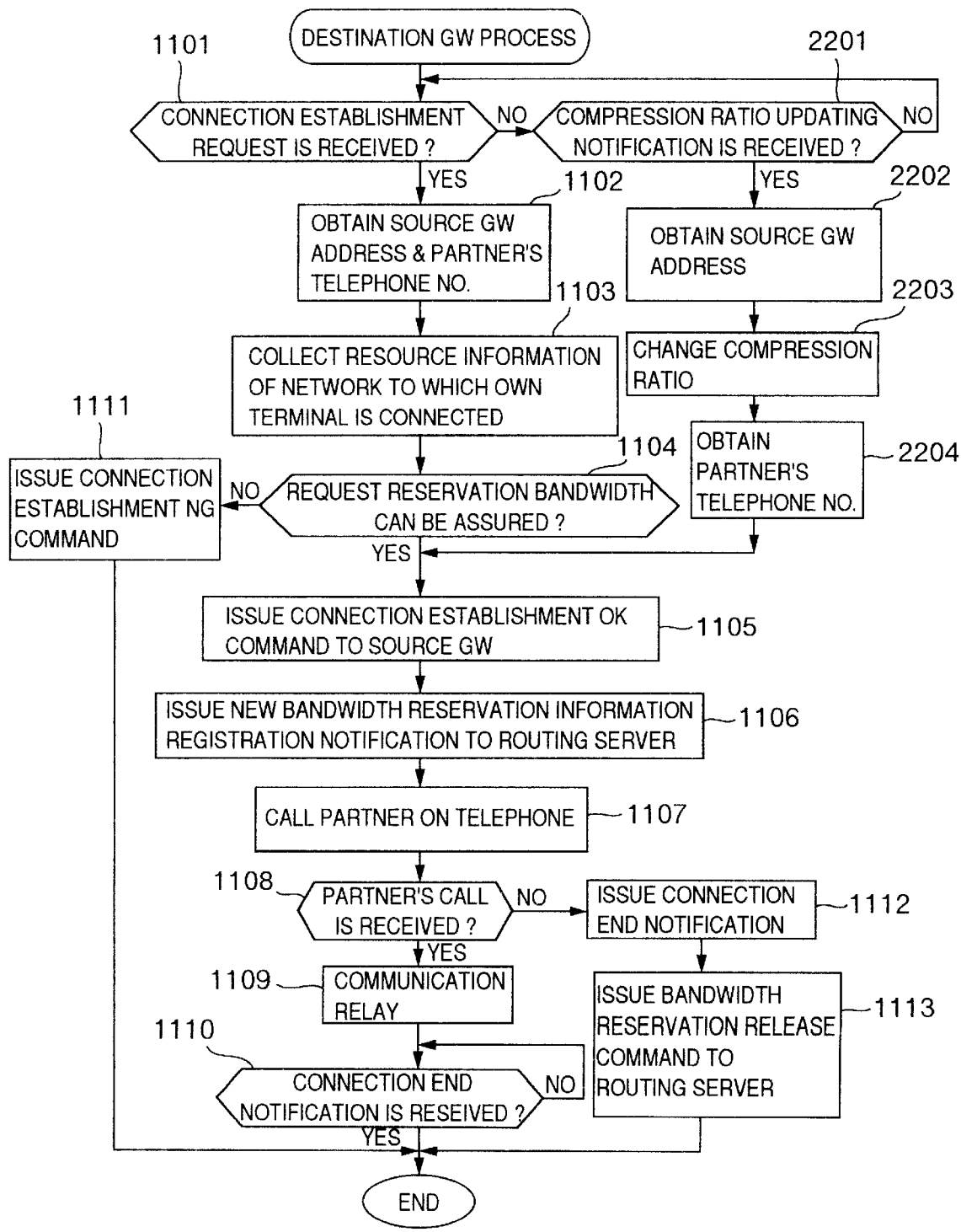
FIG. 22 is a flowchart for processes of a destination GW in the fourth embodiment.

FIG. 22 shows an example of a whole flow of the processes of the destination GW 103 in the embodiment. only the portions different from the processes of the destination GW in the first embodiment (FIG. 11) will be described.

In FIG. 22, when the compression ratio updating notification is received (YES in step 2201), the address of the source GW 103 is obtained (step 2202). An audio data compression ratio of the connection which is at present being relayed is updated to a compression ratio included in the compression ratio updating notification (step 2203). The telephone number of the partner's telephone 106 is obtained from a connection request notification newly requested (step 2204). A series of communication relaying processes after step 1105 is executed.

The compression ratio changing process mentioned above will now be described in detail. A digital/analog converting unit 304 of the GW 103 in the embodiment can encode an analog audio signal at a plurality of different rates. Specifically speaking, a plurality of hardware or software devices for audio encoding such as CS-ACELP (ITU-T Recommendation G.729), MP-MLQ/ACELP (ITU-T Recommendation G.723.1), PSI-CELP (PDC half rate), and the like are provided in the digital/analog converting unit 304. Which encoding method is used is instructed by the compression ratio updating notification processing unit 1903.

In the example described in FIG. 21, the compression ratio of the connection which has already been established between one destination GW and the own GW is changed. For this purpose, a compression ratio update notification is issued to the destination GW in step 2106. The router and the GW which received or relayed such a notification also change resources for each connection.

As a modification of the case described in FIG. 21, it is also possible to set the audio compression ratio of the connection which was newly requested so as to lie within a bandwidth which can be reserved. In this case, the other connections which have already been established are not influenced.

In the processes of FIG. 21, even if the communication is finished, the other connections in which the compression ratio has been updated are left as they are. However, a compression ratio recovering process for recovering the compression ratio of the other connections to the original value may be also inserted when the communication is finished.

(5) Modifications

Although the above embodiments have been described with respect to the audio communication, the invention is not limited to it. For example, when a communicating apparatus having an audio/video communicating function is used as a terminal like a personal computer in place of the telephone, a communication using multimedia data including audio data and video data can be performed.

In this case, although the personal computer converts the data to the digital data, it is also possible to construct such that the GW packetizes the digital data and reserves a bandwidth and, after that, transmits or receives those packets to/from the internet in a manner similar to the above.

Although the above embodiments have been described on the assumption that the telephone 106 and GW 103 are different devices, in case of using an information processing apparatus having a communicating function in place of the telephone 106, the information processing apparatus can also include the function of the GW 103.

What is claimed is:

1. A communication system comprising:
    a first communication network to which a first communication terminal is connected through a first relay apparatus;
    a second communication network to which a second communication terminal is connected;
    a plurality of second relay apparatuses for connecting said first and second communication networks, wherein the plurality of second relay apparatuses are internet gateways; and
    a retrieving apparatus for selecting one of said plurality of second relay apparatuses,
    wherein said first relay apparatus has
    means for accepting a communication request and information to specify a communication partner from said first communication terminal and inquiring a second relay apparatus which can communicate with said second communication terminals with minimum cost to said retrieving apparatus,
    means for requesting a communication in accordance with a retrieval result received from said retrieving apparatus, and
    means for relaying data of the communication which is executed between said first and second communication terminals when said selected second relay apparatus can communicate with said second communication terminal,
    wherein said retrieving apparatus has
    cost information between said second relay apparatus and said second communication terminal, and
    means for selecting a second relay apparatus for communicating with said second communication terminal at minimum cost from information specifying said second communication terminal, and said cost information,
    wherein said second relay apparatus has
    means for determining whether a communication with said second communication terminal can be performed or not in response to a communication request from said first relay apparatus and transmitting a determination result to said first relay apparatus.

2. A system according to claim 1, wherein
    said first relay apparatus has means for inquiring a second relay apparatus which is connectable to said second communication terminals with the next low cost to said retrieving apparatus in the case where said second relay apparatus transmits a determination result informing that no communication path can be established, and
    said retrieving apparatus has means for retrieving said second relay apparatus of the next low cost.

3. A system according to claim 1, wherein
    said retrieving apparatus further includes means for notifying said first relay apparatus of communication costs in case of using said second relay apparatus which can be communicated, and said first relay apparatus further has:
  means for notifying said first communication terminal of said costs notified from said retrieving apparatus and receiving an answer from said first communication terminal; and
  means for issuing a communication request or stopping staring the communication in accordance with the answer from said first communication terminal.

4. A communication system comprising:
  a first communication network to which a first communication terminal is connected through a first relay apparatus;
  a second communication network to which a second communication terminal is connected;
  a plurality of second relay apparatuses for connecting said first and second communication networks, wherein the plurality of second relay apparatuses are internet gateways; and
  a retrieving apparatus for selecting one of said plurality of second relay apparatuses,
  wherein said first relay apparatus has
  means for accepting a communication request and information to specify a communication partner from said first communication terminal and inquiring a second relay apparatus which can communicate with said second communication terminal and to which a predetermined communication bandwidth can be reserved to said retrieving apparatus,
  means for issuing a communication request with a bandwidth reservation in accordance with a retrieval result received from said retrieving apparatus, and
  means for relaying data of the communication which is executed between said first and second communication terminals when said selected second relay apparatus can communicate with said second communication terminal,
  wherein said retrieving apparatus has
  means for retrieving a second relay apparatus between which and the first relay apparatus a necessary bandwidth can be reserved and which can communicate with said second communication terminal with minimum cost,
  wherein said second relay apparatus has
  means for determining whether a communication path with said second communication terminal can be established or not in response to a communication request accompanied with a bandwidth reservation from said first relay apparatus, transmitting a determining result to said first relay apparatus, setting a communication path in the case where the communication path can be set, and reporting a bandwidth reservation to the retrieving apparatus.

5. A system according to claim 4, wherein said first communication network is the internet and the bandwidth reservation is performed by using an RSVP.

6. A system according to claim 4, wherein
  said first communication network has a plurality of third relay apparatus each for relaying the communication in said communication network,
  and said third relay apparatus has:
    means for determining whether the requested communication bandwidth can be reserved or not,
    means for transmitting said determination result to the request source; and
    means for reserving the request bandwidth in the case where said relay apparatus can reserve said bandwidth and, thereafter, communicating with the other third or second relay apparatus by using said bandwidth.

7. A system according to claim 4, wherein said retrieving apparatus comprises:
  a bandwidth reservation information storage table for registering a bandwidth of a communication path between said first and second relay apparatuses and a bandwidth reservation status as a set;
  means for determining whether the bandwidth that is requested between said first and second relay apparatuses can be reserved or not by referring to said bandwidth reservation information storage table; and
  means for updating said bandwidth reservation information storage table in the case where a bandwidth reservation registration is newly notified from said second relay apparatus.

8. A system according to claim 7, wherein said first relay apparatus has:
  means for notifying said first communication terminal of a determination result for said bandwidth reservation request; and
  means for attempting the communication to said second communication terminal without passing through said first communication network in the case where said determination result indicates that the communication request cannot be satisfied and said first communication terminal further issues a communication request.

9. A system according to claim 8, wherein said first relay apparatus has:
  means for calculating a compression ratio of data to be communicated within a range of a bandwidth allocated between said specific relay apparatuses; and
  means for notifying the second relay apparatus of a compression ratio updating notification in the case where said calculated compression ratio differs from a compression ratio used in the present communication,
  and said first and second relay apparatuses have:
    means for compressing data at a plurality of compression ratios; and
    means for changing a compression ratio of data between said relay apparatus and a partner's relay apparatus in the case where the compression ratio updating notification is received.

10. A system according to claim 4,
  wherein said first and second relay apparatus further include means for changing compression ratio of data between the relay apparatus and other relay apparatus, and when said first relay apparatus cannot reserve the predetermined communication bandwidth, said data compression ratio changing means of said first and second relay apparatus change the data compression ratio of currently established connections to assign the saved bandwidth to new connection.

11. A relay apparatus for relaying data between a first communication terminal and a first communication network, comprising:
  means, in the case where a second communication terminal is connected to a second communication network which is connected to said first communication network through a plurality of second relay apparatuses, for accepting a communication request to said second communication terminal and information to specify said second communication terminal from said first communication terminal, and for inquiring a second relay apparatus which is connectable to said second communication terminal for communicating with said second communication terminal at minimum cost among said plurality of second relay apparatuses to which said second communication terminal is connected to a retrieving apparatus with said specific information;

means for requesting a communication in accordance with a retrieval result received from said retrieving apparatus; and means for relaying data of a communication which is executed between said first and second communication terminals when said selected second relay apparatus can communicate with said second communication terminal, wherein said second relay apparatuses are internet gateways.

12. A relay apparatus for relaying data between a first communication terminal and a first communication network, comprising:

means, in the case where a second communication terminal is connected to a second communication network which is connected to said first communication network through a plurality of second relay apparatuses, for accepting a communication request to said second communication terminal and information to specify said second communication terminal from said first communication terminal, and for inquiring a second relay apparatus which can communicate with said second communication terminal with minimum cost and between which and the relay apparatus a predetermined communication bandwidth can be reserved to a retrieving apparatus with said specific information;

means for requesting a communication accompanied with a bandwidth reservation in accordance with a retrieval result received from said retrieving apparatus; and means for relaying data of a communication which is executed between said first and second communication terminals when said selected second relay apparatus can communicate with said second communication terminal, wherein said second relay apparatuses are Internet gateways.

13. A relay apparatus according to claim 11, further comprising:

means for changing compression ratio of data between the relay apparatus and other relay apparatus, wherein, when the predetermined communication bandwidth cannot be reserved, said data compression ratio changing means changes the data compression ratio of currently established connections to assign the saved bandwidth to new connection.

14. A retrieving apparatus connected to a communication network and retrieving a communication path for connecting a plurality of relay apparatuses which are connected to said communication network, comprising:

a gateway location table, some of said relay apparatuses working as gateways in which a communication terminal which is connected to each of said gateways, and a distance and/or communication costs between said communication terminal and each of said gateways are registered as a set;

a bandwidth reservation information storage table in which a bandwidth among said plurality of relay apparatuses in said communication network and a bandwidth reservation status are registered as a set;

means for selecting a communication path which communication cost becomes minimum with respect to communicating between the communication terminal and each of said gateways and determining whether a bandwidth which is required for communication between said selected plurality of relay apparatuses can be reserved or not from said bandwidth reservation information storage table in response to an inquiry from said relay apparatus and answering; and means for updating said bandwidth reservation information storage table when a bandwidth reservation registration or a reservation release of the reserved bandwidth is notified from said relay apparatus.

\* \* \* \* \*